United States Patent
Leem

(10) Patent No.: US 9,796,363 B2
(45) Date of Patent: Oct. 24, 2017

(54) BRAKE PEDAL ASSEMBLY

(71) Applicant: KSR IP Holdings, LLC, Wilmington, DE (US)

(72) Inventor: Daniel Leem, Chatham (CA)

(73) Assignee: KSR IP Holdings, LLC, Wilmington, DE (US)

( * ) Notice: Subject to any disclaimer, the term of this patent is extended or adjusted under 35 U.S.C. 154(b) by 0 days.

(21) Appl. No.: 15/006,788

(22) Filed: Jan. 26, 2016

(65) Prior Publication Data
US 2016/0214581 A1  Jul. 28, 2016

Related U.S. Application Data

(60) Provisional application No. 62/107,769, filed on Jan. 26, 2015.

(51) Int. Cl.
*B60T 7/06* (2006.01)
*B60R 21/09* (2006.01)
*G05G 1/327* (2008.04)

(52) U.S. Cl.
CPC .............. *B60T 7/065* (2013.01); *B60R 21/09* (2013.01); *G05G 1/327* (2013.01)

(58) Field of Classification Search
CPC .......... B60R 21/09; B60T 7/065; G05G 1/327
See application file for complete search history.

(56) References Cited

U.S. PATENT DOCUMENTS

| 7,665,387 | B2 * | 2/2010 | Park | B60R 21/09 180/271 |
| 8,973,462 | B2 * | 3/2015 | Olajos | G05G 1/327 74/512 |
| 2015/0232072 | A1 * | 8/2015 | Periasamy | B60T 7/06 74/512 |

FOREIGN PATENT DOCUMENTS

ES          EP 1323602 A1 *  7/2003  ............. B60T 7/065

* cited by examiner

*Primary Examiner* — Thomas C Diaz
(74) *Attorney, Agent, or Firm* — Dinsmore & Shohl LLP

(57) ABSTRACT

A pedal assembly mounted to a vehicle includes, a pedal arm having an upper portion and a lower portion and a striker bracket pivotally connected to the upper portion of the pedal arm where the striker bracket further removably connected to the lower portion of the pedal arm. A first positioned is defined before a collision where the striker bracket is connected to the lower portion of the pedal arm. A second positioned is defined after a collision where the striker bracket rotates away from the lower portion of the pedal arm.

4 Claims, 5 Drawing Sheets

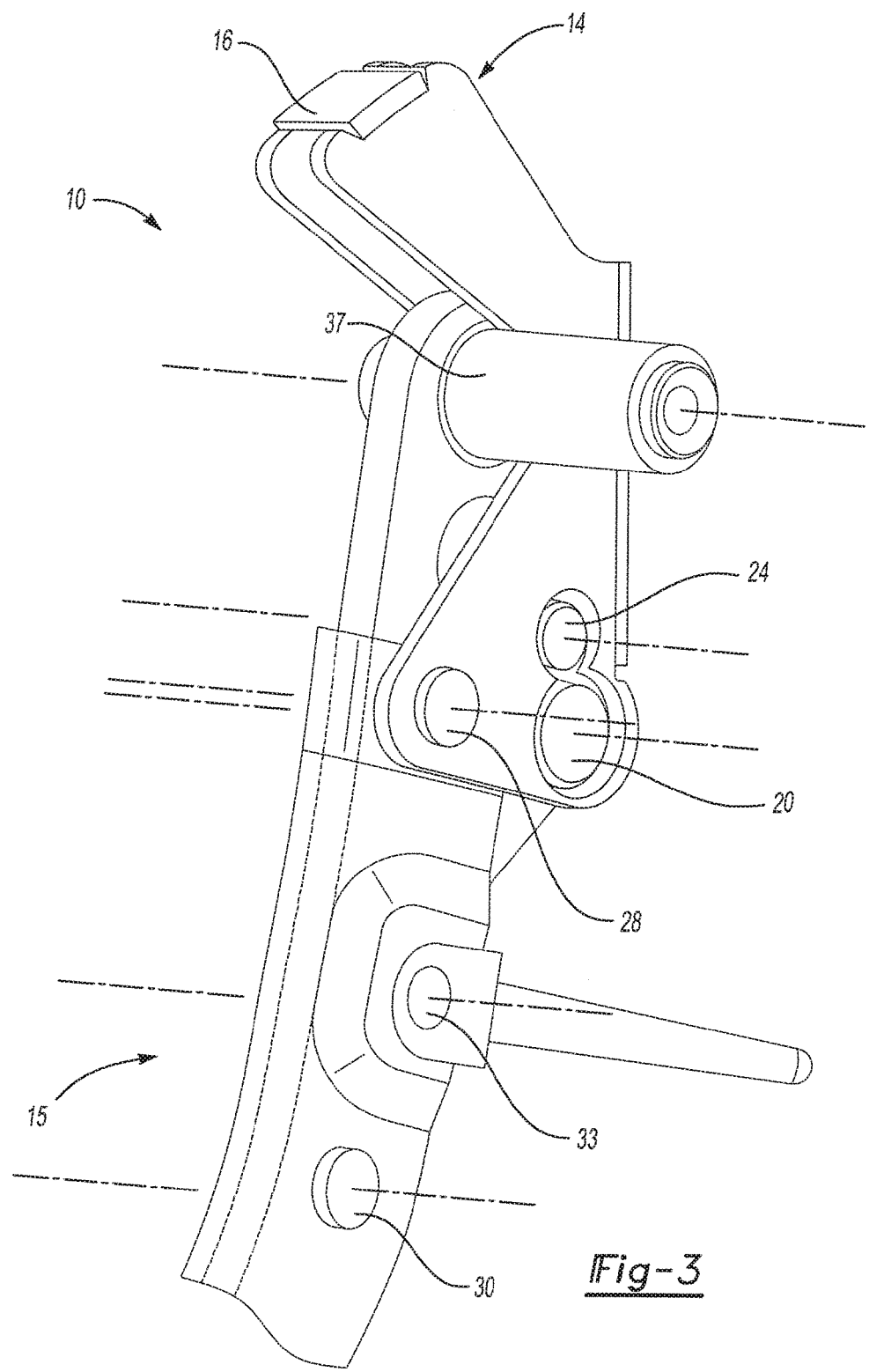

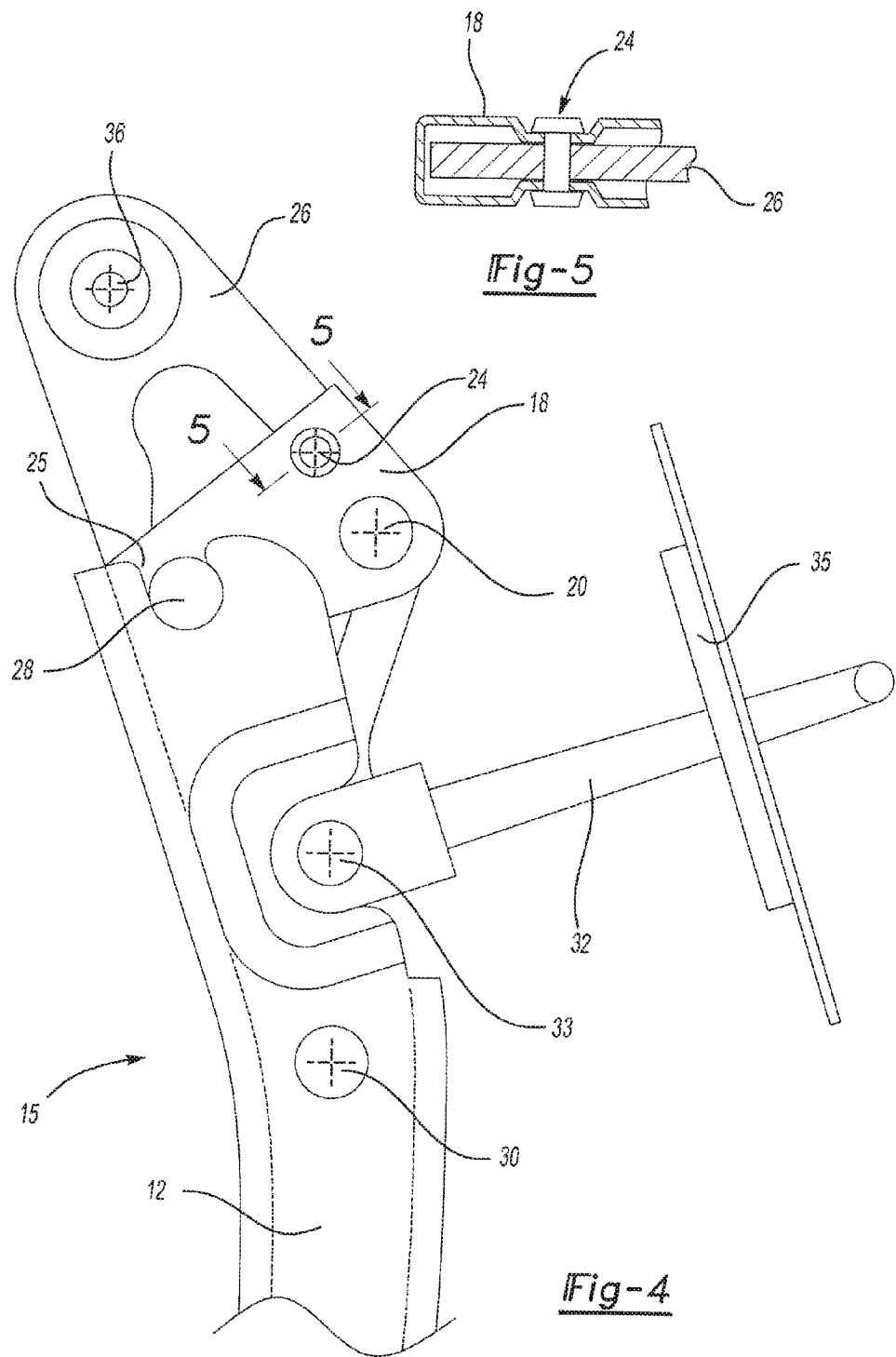

BRAKE PEDAL ASSEMBLY

CROSS-REFERENCE TO RELATED APPLICATIONS

The present Utility patent application claims priority benefit of the U.S. provisional application for patent Ser. No. 62/107,769, filed on Jan. 26, 2015, under 35 U.S.C. 119(e)., the contents of which are incorporated herein its entirety.

TECHNICAL FIELD

The present specification relates generally to pedal assemblies. More specifically, the present specification relates to a pedal arm assembly having an active release mechanism for release during a collision.

BACKGROUND

It is known to provide vehicle pedal assemblies which move to keep pedals from being forced into the passenger area when there is a front end collision. One type of system uses a crossbar to release the pivot pin supporting the pedal arm. This permits the pedal arm to be easily rotated about an intermediate point on the pedal arm such as the arm attachment for a brake rod or clutch master cylinder. However, prior assemblies do not permit activation of the pedal system after releasing and may result in parts being ejected into the passenger compartment.

Accordingly, there exists a need in the art for a pedal assembly allowing for activation of the pedal system after releasing.

SUMMARY

In one embodiment, a pedal assembly for a vehicle of the present application includes a pedal arm having an upper portion and a lower portion, the upper portion of the pedal arm mounted to a housing at a first pivot point, the pedal arm pivotable about the first pivot point during normal operation of the pedal assembly, a striker bracket pivotable about a second pivot point on the upper portion of the pedal arm and a shear pin extending through the upper portion of the pedal arm and the striker bracket, the shear pin breakable during movement of the pedal arm from a first position to a second position.

The first position is defined at a point in time before a collision where the shear pin is intact. The second positioned defined at a point in time after a collision where the shear pin is broken, the second position further defined where the striker bracket disengages from the lower portion of the pedal arm by rotating away from the lower portion of the pedal arm thereby allowing the lower portion of the pedal arm to freely rotated about a third pivot point.

In this embodiment, the third pivot point is the connection point between the upper portion and the lower portion of the pedal arm. The pedal arm connects to the housing, the pedal arm connected to the housing at the first pivot point. The upper portion of the pedal arm includes an elongated slot configured to engage the striker bracket. The striker bracket may include a pin configured to connect with and slide within the elongated slot of the upper portion of the pedal arm.

When the pedal assembly in the second position, the pin moves to un uppermost position spaced apart from the lower portion of the pedal arm. The lower portion of the pedal includes a slot configured to engage the pin when the pedal assembly is in the first position. The striker bracket includes a striker plate configured to receive an external force, upon receiving of the external force, the striker bracket configured to rotate away from the lower portion of the pedal arm. The upper portion and the lower portion of the pedal are separate and distinct pieces.

In another embodiment, a pedal assembly mounted to a vehicle includes, a pedal arm having an upper portion and a lower portion and a striker bracket pivotally connected to the upper portion of the pedal arm where the striker bracket further removably connected to the lower portion of the pedal arm. A first positioned is defined before a collision where the striker bracket is connected to the lower portion of the pedal arm. A second positioned is defined after a collision where the striker bracket rotates away from the lower portion of the pedal arm. In this embodiment, a shear pin may extend through the upper portion of the pedal arm and the striker bracket, the shear pin breakable upon receipt of an external force upon the striker bracket. An actuator may be used to supply the external force on the striker bracket.

In this embodiment, the pedal arm connects to a main bracket, the pedal arm connected to the main bracket at the first pivot point. The upper portion of the pedal arm includes an elongated slot configured to engage the striker bracket. The striker bracket includes a pin configured to connect with and slide within the elongated slot of the upper portion of the pedal arm. The pedal assembly in the second position, the pin moves to un uppermost position spaced apart from the lower portion of the pedal arm. The lower portion of the pedal includes a slot configured to engage the pin when the pedal assembly is in the first position. In this embodiment, the striker bracket includes a striker plate configured to receive an external force. Upon receiving of the external force, the striker bracket configured to rotate away from the lower portion of the pedal arm. In this embodiment, the upper portion and the lower portion of the pedal are separate and distinct pieces. The pedal assembly is mounted within a housing, the housing connected to a main pivot point connecting the pedal arm to the housing.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3 illustrates a close up perspective view of the assembly in accordance with one or more embodiments of the present specification;

FIG. 4 illustrates a side view of the pedal assembly in accordance with one or more embodiments of the present specification;

FIG. 5 illustrates a cross sectional view along the line 5-5 as shown in FIG. 4 in accordance with one or more embodiments of the present specification.

DETAILED DESCRIPTION OF THE DRAWINGS

Figure 1:
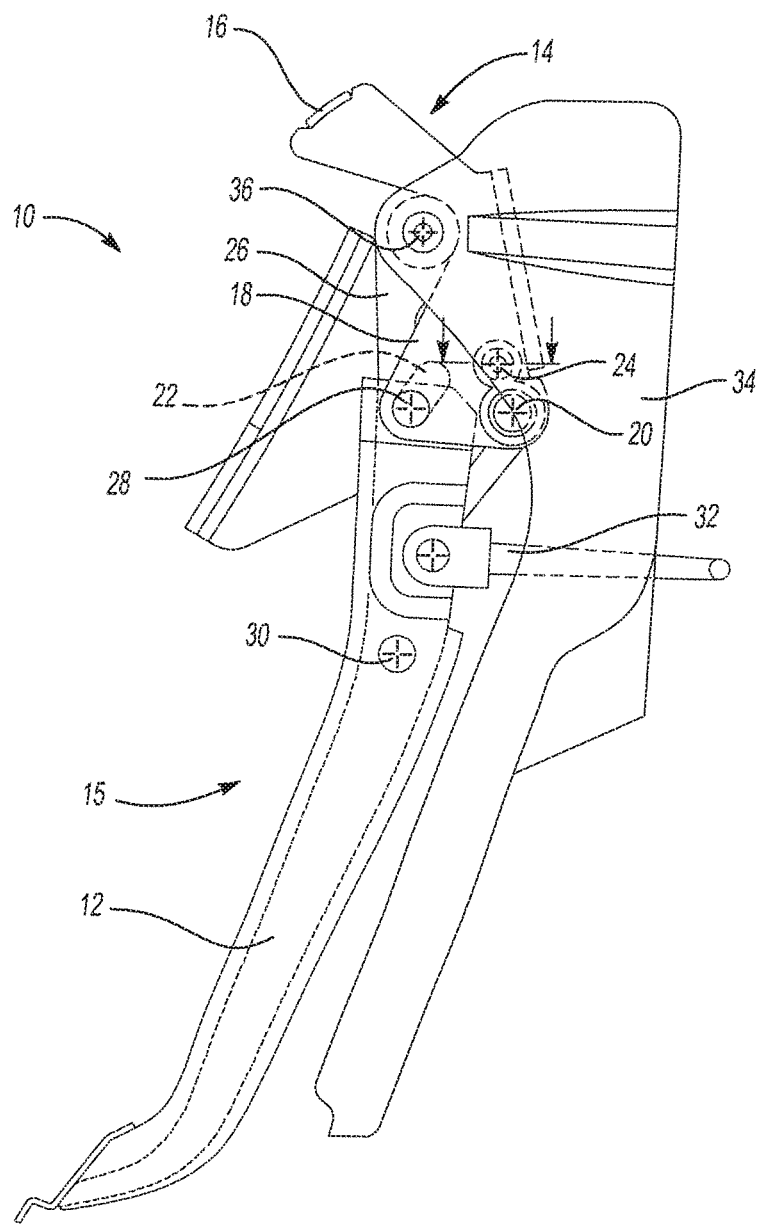
FIG. 1 is a side view of the pedal assembly having an active release component in accordance with one or more embodiments of the present specification.

The pedal aim of the present invention provides for an active release system for a pedal assembly. A striker bracket is provided connected to the upper portion of the pedal arm and is pivotable about a separate bracket upon the event of a front end collision. The pedal arm includes an upper portion and a lower portion. The upper portion and the lower portion and separate and distinct pieces. The striker is releasably connected to the pedal arm and rotatably connected to the upper portion of the pedal arm. Furthermore, a shear pin is provided which is breakable upon the event of a front end collision. Breakage of the shear pin permits rotation of the striker bracket. Before a collision, the shear pin prevents rotation of the striker bracket.

Referring now to FIGS. 1-6, the pedal assembly 10 includes a pedal arm 15 and a striker bracket 14. The pedal arm includes an upper portion 26 and a lower portion 12. The upper portion 26 and the lower portion 12 are separate and distinct pieces. The upper portion 26 and the lower portion 12 are connected at a pivot point 30. The pivot point 30 may also be referred to as the third pivot point 30.

Figure 6:
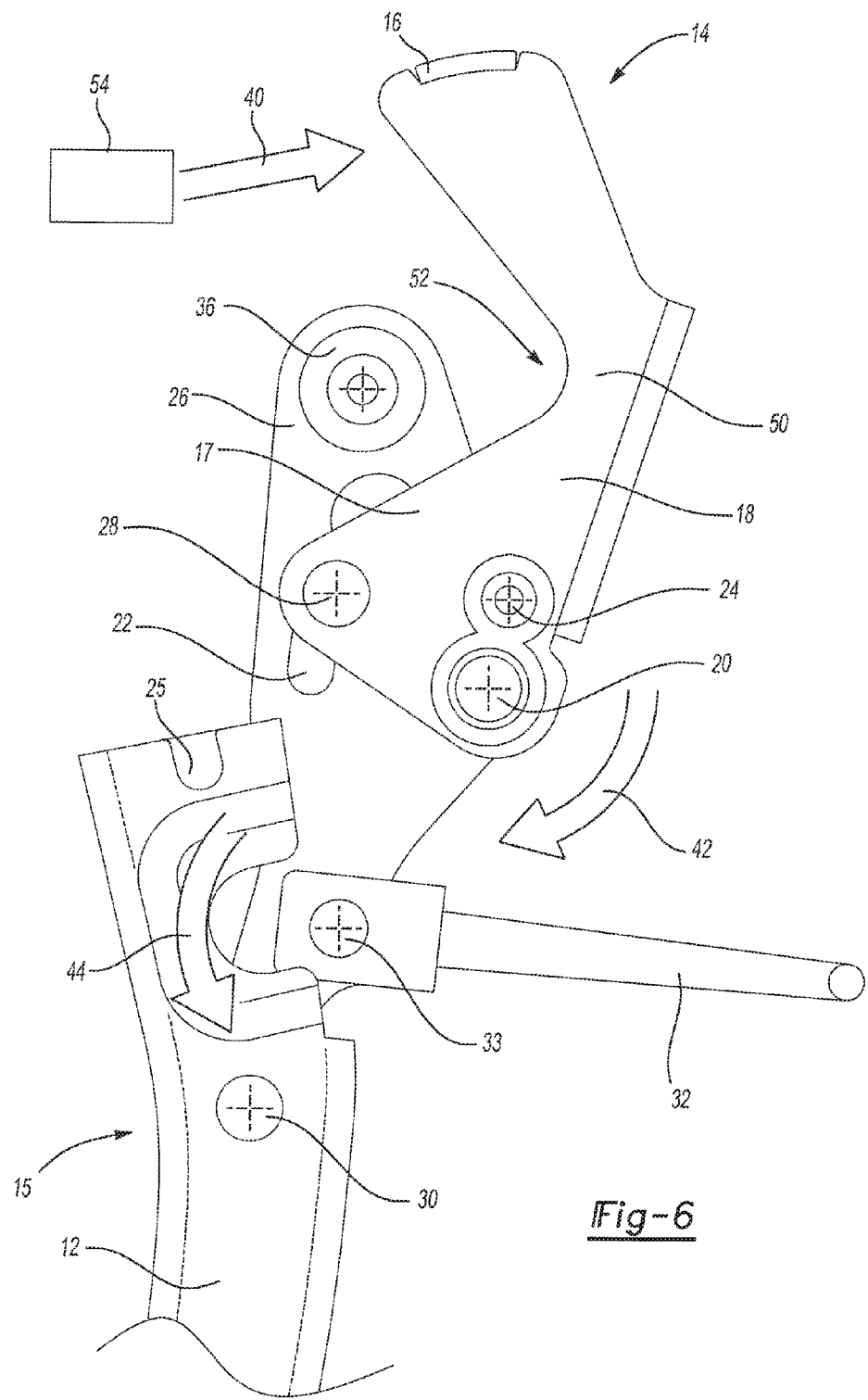
FIG. 6 illustrates a side view illustrated the movement of the pedal assembly after a collision in accordance with one or more embodiments of the present specification.

The first position is defined at a point in time before a collision where the shear pin 24 is intact (such as shown in FIG. 1). The second positioned defined at a point in time after a collision where the shear pin 24 is broken (such as shown in FIG. 6), the second position further defined where the striker bracket 14 disengages from the lower portion 12 of the pedal arm 12 by rotating away from the lower portion 15 of the pedal arm 15 thereby allowing the lower portion 12 of the pedal arm to freely rotated about a third pivot point 30.

The striker bracket 14 includes an upper end 16 (containing the striker plate) and a lower end 18. The upper end 16 is adapted to accept an external force thus forcing the striker bracket to rotate about a pivot pin 20, located at the lower portion of the striker bracket 14. The pivot pin 20 may also be referred to as the second pivot point. The striker bracket 14 is slightly u-shaped and resembles a boomerang in shape. The striker bracket 14 includes a bent portion 50 connecting the upper portion 16 to a lower portion 17. The bent portion 50 includes the indented portion 52. The indented portion 52 is configured to rest around the main pivot 36 when in the first position.

Upon a sufficient force received from the upper portion 16 of the striker bracket 14, a shear pin 24 breaks thus allowing the striker bracket 14 to rotate in a clockwise direction away from a upper pedal arm 26. The striker bracket rotates away from a main pivot 36 (and corresponding rod). The main pivot point 36 may also be referred to as the first pivot point. The main pivot point 36 connects the pedal arm, specifically the upper portion 26 of the pedal arm, to the housing 34. The striker bracket is operable only to rotate as far as the slot 22 will permit it to travel (i.e. until the support pin 28 contacts the upper portion of the slot 22).

The force applied to the upper portion 16 of the striker bracket 14 may be in the form of an actuator or force from an external crossbeam or other body member during a collision. The force, as illustrated by directional arrow 40, must be sufficient enough to break the shear pin 24 positioned at the lower portion of the striker bracket 14. The force pushes at the upper end 16 of the striker bracket 14 to rotate the striker bracket 14 about the pivot pin 20. This movement is illustrated by directional arrow 42 of FIG. 6. As the striker bracket 14 is rotated about the pivot pin 20, a support pin 28 is moved within an elongated slot 22. The elongated slot 22 is positioned on the upper pedal arm 26 of the pedal assembly 10.

The slot 22 is adapted to slidably receive the support pin 28. Support pin 28 rests within the lower portion of the slot 22 when the system is at rest before any collision. During a collision, the support pin 28 slides upwards within the slot 22 to an upmost position at a top end of the slot 22. This top portion of the slot 22 prevents the striker 14 from rotating any further.

The shear pin 24 is made from a breakable material such as a brittle metal, ceramic, plastic, plastic like, polymer or polymer like material.

After the striker 14 has rotated to an after crash position, such as illustrated in FIG. 6, the pedal arm 15 is free to rotate about the support pin 30. The pedal arm 15 includes a lower portion 15 and an upper portion 26. The pedal arm 15 pivots about the support pin 30 and pivots away from a push rod 32 pivotally connected at 33 to the pedal lower portion 12. Furthermore, during and after a collision, the upper portion of the pedal arm 15 separates from both the upper pedal arm 26 and the striker bracket 14.

Figure 2:
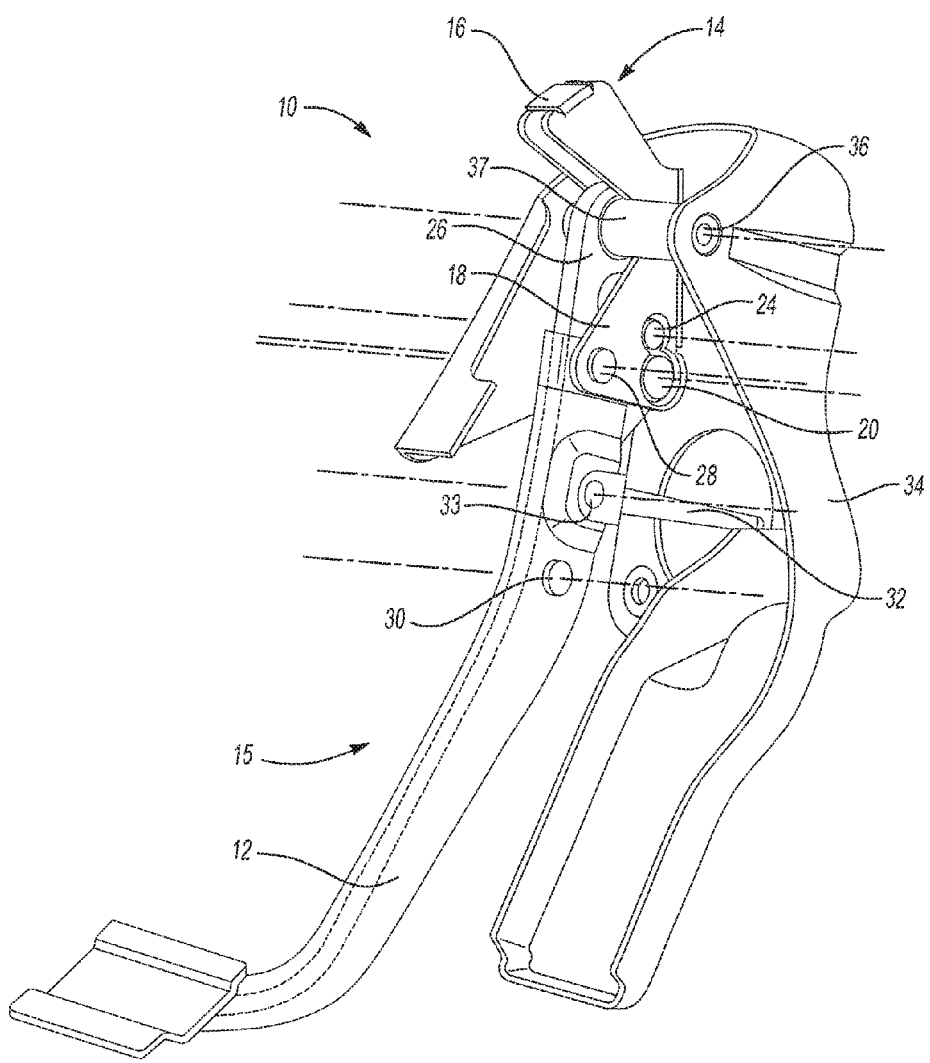
FIG. 2 illustrates a perspective view of the brake pedal assembly in accordance with one or more embodiments of the present specification.

In a pre-crash configuration (such as shown in FIGS. 1 and 2), the support pin 28 is releasably connected to an aperture 25 located at the upper portion of the pedal arm 15. Prior to a collision, the support pin 28 and the aperture 25 rest together loosely but are easily removed from each other upon the force during a collision. After the support pin 28 is removed from the aperture 25, the support pin 28 travels within the slot 22. After a collision, the pedal arm 15 is free to rotate about the support pin 30.

During normal pedal operation, the pedal arm 15 is adapted to pivot about the main pivot point 36. The main pivot point 36 is positioned at an upper portion of the upper pedal arm 26. During normal pedal operation, the pedal arm 15, the upper pedal arm 26, and the striker bracket 14 all rotate about the main pivot 36.

The striker bracket 14 further includes an indented portion 50. The indented portion 50 is adapted to contact the main pivot 36. The main pivot 36 may include a rod portion 37. After a force is applied to the upper end 16 of the striker bracket 14, the indented portion 50 of the striker bracket 14 is rotated away from the rod 37 extending between spaced apart surfaces of the housing 34 (FIG. 2), in the direction of arrow 42 (further as indicated in FIG. 6).

As previously discussed, a linear actuator 54 (FIG. 6) may be provided to supply adequate force to the upper portion 16 of the striker bracket 14 during the event of a front end collision, see directional arrow 40 extending towards striker bracket 14. The actuator may include a spring or other forcible assembly connected to various rods or connection members. The actuator is typically actuated by an explosive charge. The actuator may be activated by a single signal from a crash sensor. The actuator is adapted to provide sufficient force to the upper portion 16 of the striker bracket 14 to break the shear pin 24 and to rotate the striker bracket about the main pivot 20.

The design of the slot 22 allows for maximizing the use of available packaging within the vehicle. In the present embodiment, the striker bracket 14 can move in a range of between 12-30 millimeters. However, this range can vary several millimeters depending on packaging specifications within the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A vehicle pedal assembly, comprising:
   a support within an interior of the vehicle and defining a first pivot point;
   a pedal arm pivotally secured to said support, said pedal arm including an upper portion and a lower portion;
   a striker pivotally mounted about a second pivot point on said upper portion a spaced distance from said first pivot point, an edge of said striker contacting said support concurrent with an underside of said striker contacting an opposing upper edge of said lower portion during normal operation of said pedal arm;
   said striker further having an irregular boomerang shape, with a narrowed and indented portion defining said contact edge with said first pivot point; and
   upon an impact event exerted upon said striker, said striker being caused to displace about said second pivot point away from said support and said lower portion, allowing said lower portion to rotate about a third pivot point established with said upper portion.

2. The pedal assembly as described in claim 1, said striker further comprising a pin slidable in an elongated slot configured in said upper portion to define a range of rotation of said striker about said second pivot point.

3. The pedal assembly as described in claim 2, further comprising a shear pin extending between said upper portion and said striker during normal operation, said shear pin fracturing upon the impact event.

4. The pedal assembly as described in claim 1, further comprising a push rod extending from said upper portion and defining a support location for said lower portion during normal operation, rotation of said lower portion being in a direction away from said push rod.

* * * * *